Figure 1:
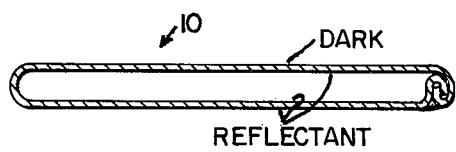

United States Patent [19]

Thiel

[11] 4,031,881

[45] June 28, 1977

[54] SOLAR HEATER

[76] Inventor: Heinz E. P. Thiel, 468 Willis Drive, Oakville, Ontario, Canada

[22] Filed: Oct. 20, 1975

[21] Appl. No.: 624,249

[52] U.S. Cl. .............................. 126/271; 165/171
[51] Int. Cl.² ........................................ F24J 3/02
[58] Field of Search .......... 126/270, 271; 237/1 A; 165/172, 173, 171

[56] References Cited

UNITED STATES PATENTS

| 2,480,706 | 8/1949 | Brinen | 126/271 |
|---|---|---|---|
| 2,553,302 | 5/1951 | Cornwall | 126/271 |
| 3,513,828 | 5/1970 | Masters | 126/271 |
| 3,934,323 | 1/1976 | Ford | 126/271 |
| 3,937,208 | 2/1976 | Katz | 126/271 |

FOREIGN PATENTS OR APPLICATIONS

| 1,141,261 | 4/1957 | France | 126/270 |
|---|---|---|---|
| 340,987 | 10/1959 | Switzerland | 126/271 |

*Primary Examiner*—Kenneth W. Sprague
*Assistant Examiner*—James C. Yeung

[57] ABSTRACT

A solar heater has metal pipes arranged in an array connected to carry liquid which will be heated by heat received from solar radiation transmitted through the pipe walls. The pipes are formed from sheet metal so that their internal and external reflectivity may be controlled. The pipes are provided with a dark exterior on the side which will face the sun.

2 Claims, 3 Drawing Figures

SOLAR HEATER

This invention relates to a solar heat collector that is a device for converting the heat of the sun's rays into a heat in a liquid for heating domestic, commercial industrial and other structures and such other applications as would benefit from utilization of the heat from the sun's rays as converted by the device of the invention. The efficiency of the inventive device is proportional to the intensity of the rays from the sun as the rays may vary on intensity with the seasons be day and by night with variations in the cloud cover. In regard to occlusion by cloud it should be noted that the device will continue to operate using the infra red part of the spectrum which can penetrate cloud cover.

The device provides an array of formed liquid carrying pipes which array may be oriented to face in the mean direction from which the sun's rays are incident with the pipes being so arrayed that one side of each pipe is exposed to the sun rays incident from such direction. It is well known to provide that the side of liquid conduits facing the incidence of the sun's rays shall be blackened darkened or otherwise rendered more heat absorptive and no claim for this feature is made herein. However it has not, to my knowledge, been previously suggested, that the surface of the pipes facing away from the intended radiation direction shall be reflective. This is one of the preferred arrangements in the invention described. The effect of having such reflective material on the remote side is that it reduces the amount of heat lost from the liquid in the pipes to the environment on the side of the array remote from the sun which, in the normal course, will be cooler than the liquid in the pipes.

As will be appreciated, the heat from the sun is used to heat liquid flowing through the pipes during the hours between sunrise and sunset. The flow of liquid may therefore be shut off at other times when the environment would be colder than the liquid in the pipes and the heat transfer characteristics of the device would be reversed.

In another aspect of the invention, the collective attitude of the surfaces of the pipes of the array on the side intended to face the incident radiation from the sun is a flat plane to avoid shadows from the pipes in the array on one another, when the sun is at the opposite ends of its excursion of each side of a mean incidence direction. The planar effect is achieved both by arranging the sun-receiving surface of the pipes in an approximate plane but further by having the individual pipes shaped to provide substantially flat parallel sides facing toward and away from the means incidence direction, and with the pipe being relatively thin in the dimension between the flat parallel sides. The thin pipe, wide in its dimension transverse to the incidence direction has an inherent advantage since the column of liquid in a pipe is thin transverse to the sun's rays and the liquid therein is relatively easily heated by the transfer of the heat transferred from the outside to the inside of the tubes.

The liquid used in the pipes will most commonly be water where the application is used in temperate climates but may be any liquid having the necessary heat capacity and handling properties. Where the invention would be used in cold climates the liquid would have a lower freezing point than water. An example of such a liquid is ethylene glycol.

It will also be noted that the pipes used in the array must be made of metal to ensure good heat transfer from the outside to the inside of the pipe.

In another aspect of the invention it is necessary that the pipes be made as thin as possible not only as a saving in expense but also to avoid, so far as practically possible, the metal in the pipe acting as a heat sink and thus reducing the heat transferred to the liquid. The maximum thinness of the pipe would therefore be dictated by structural considerations and the pipe will be made as thin as the expense of fabrication will permit, and as required to provide sufficient thickness to sustain the shape of the pipe. Whatever the metal forming the tube the maximum wall thickness to allow good heat transfer is believed to be about 0.012 inches, and this is also found to be the practical upper limit for the thickness of the tube walls when brass is the material used for the tube. With the brass tubes which have been used, the preferred wall thickness is 0.006 inches, this thickness being believed to be the best compromise between the requisites of : low thermal mass, good thermal conductivity, economy of fabrication and requisite strenth.

In another aspect of the invention, the tubes of the array are provided with a high inner reflectivity to increase the retention of the heat gained by the liquid. The inner reflectivity of the tubes may easily be controlled due to the preferred method of forming them in accord with the invention, whereby the tubes are fabricated from flat sheet. The reflectivity for the inner surface of the tubes may therefore be specified in the selected surface of the flat sheet. The reason for the improved heat retention obtained with substantial reflectivity inside the tubes is not known for certain but it is believed due to the fact that such inner surface better reflects the infra red radiation from that liquid in the pipes which is spaced from the conduit wall.

The preferred thickness of the brass tubes is 0.006 inches. However considering the range of metals it is preferred to use a tube wall thickness of not more than 0.012 inches. Above such thickness too much of the heat from the solar radiation will be absorbed by the tube walls, and the cost of the metal in the tube wall become unduly high.

Although optical methods of determining reflectivity will be satisfactory to determine a surface sufficiently reflective for use in the retention of heat it is preferred to determine the deviation of the sheet contour from the average, such as be measurement on a profilometer.

Figure 3:
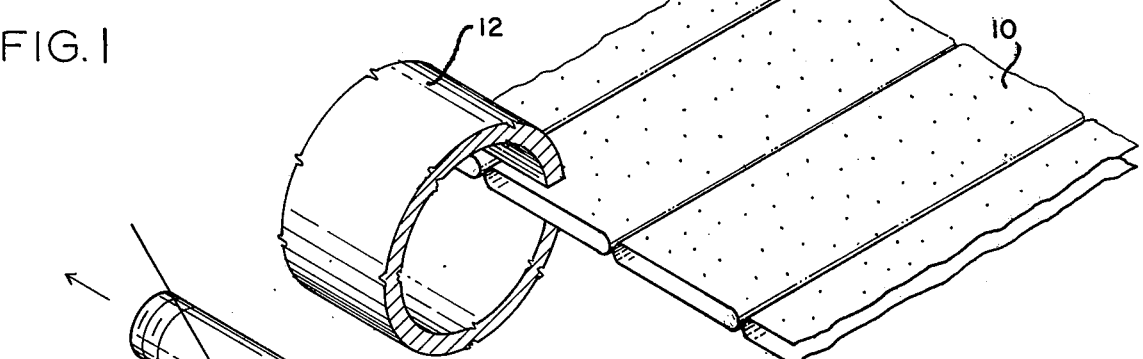
Figure 2:
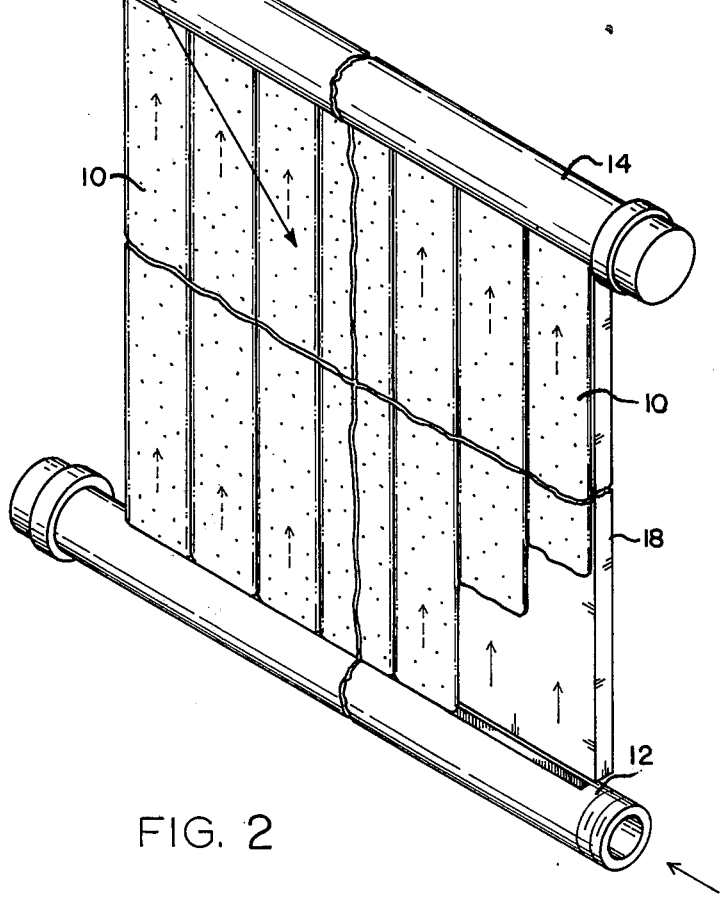

In drawings which illustrate a preferred embodiment of the invention:

FIG. 1 is a cross-section of a tube for the array formed in accord with the invention, FIG. 2 shows a perspective view of an array of such tubes; and FIG. 3 shows the junction between the tubes and the supply pipe.

The drawings show an array of pipes 10 arranged side by side and connected in parallel between a liquid supply conduit 12 and a removal conduit 14. Thus the liquid to be heated is supplied to one end of pipes 10 by conduit 12 and water heated in pipes 10 is carried away by pipes 14. I have found brass suitable for the tubes 10 and prefer to use brass, copper and bronze, although any other metals of sufficient strength would also be suitable, and would have the necessary thermal characteristics.

As illustrated in FIG. 1, the pipe is formed from a sheet by bending the sheet to form a substantially parallel sided tube 10, with a width preferably 7 to 10 times it's thickness. The wide parallel sides of the tubes are designed to provide wide flat surfaces having a large area to receive the sun's rays and to allow the arrangement of a plurality of these tubes in an array to present a substantially planar overall surface.

As suggested by FIG. 1, the tube is formed from a flat sheet and bent to the preferred shape. FIG. 1 shows the tube formed with a seamed joint. It will be noted that if desired the joint may also be formed by welding.

The preferred reflectivity for the inner surface of the brass pipe is greater than that corresponding to an average deviation of up to about 60$\mu$ (.000060 inches). This measurement is made on the side of the sheet which will form the inner wall of the tube. This measurement is made with a profilometer. The form of such profilometer which I prefer to use is known as the Talysurf, produced by the Rank Precision Industries (Canada) Limited, 21 Metropolitan Street, Toronto, Canada. Thus the desired degree of reflectivity may be obtained by obtaining a sheet of the metal to be used to make the metal pipe with the surface which will form the inside of the pipe selected to have a coarseness less than that corresponding to a centre-line average of less than 60$\mu$.

Although some emphasis has been placed on the internal reflectivity of the pipe, it will be noted that the other side of the sheet (corresponding to the outer side of the tube) is provided with the same reflectivity so that the sun-remote exterior side of the formed tube will be reflectant. Thus the tube 10 when formed will be reflectant on both exterior flat sides. After being formed the pipes are treated with a thin coating (usually but not always blackened or darkened) on the side to face the approximate direction of the incident solar rays to increase the absorption of heat from the suns rays.

The pipes 10 are placed as close to one another as possible in the array but, although joined to pipes 12 and 14 are preferably not permanently joined to each other. This facilitates the removal and replacement of individual pipes in the event of their breakage or damage.

The tubes 12 and 14 are slotted as indicated at 16 to receive the ends of all of the tubes 10 in the array. The tubes are then fixed in place by solder which acts also to fill in the slot openings outside of each pipe and between the pipes.

The maximum widths of the pipes are determined mainly by the expense of fabrication and the sustaining strength required of the thin pipe walls. However it should be noted that the operation of the device is better where a plurality of pipes provide a number of parallel courses rather than a single wide course. The reason is believed to be that better heat transfer to the liquid is obtained where the pipes are not so wide that there is a large differential in flow rate across the pipe wideth thus it is believed that the preferable pipe width is ½ to 1.

The pipe is made thin so that the heat absorbed from the treated surface of the array, is, so far as possible used to heat all of the liquid flowing through the device.

The flat treated surfaces of the pipes 10 are preferably arranged in a plane as indicated in the drawings. This avoids shadows being cast by one pipe on another as the sun crosses the sky. The array is arranged preferably to face the mean or average incident direction (indicated schematically by the arrow in FIG. 2) of the suns rays.

The array is arranged therefore, as shown in FIG. 2 with the treated sides of the pipes facing the direction of incident solar rays. The side of the tubes remote from the sun are reflectant as indicated in FIG. 2. Backing the reflectant side of the pipes is preferably a layer of insulation 18 which assists in heat retention by the liquid in the tubes. The insulating layer is omitted from FIGS. 1 and 3 clarity.

The pipe 12 provides water to be heated and the pipe 14 carries the heated water to a swimming pool, house or the like.

I claim:

1. A solar heater comprising:
    a plurality of liquid conducting metal pipes arranged in an array to receive incident solar radiation from a mean direction on one side of said array,
    said metal pipes each being formed from sheet metal having a predetermined reflectivity on both sides bent to form a tube,
    means for connecting to said pipes a liquid conduit connected to supply liquid to said pipes to flow therethrough,
    means for connecting to said pipes a liquid conduit for carrying away liquid which has flowed through the pipes in said array,
    said pipes in said array being provided, with a treated heat absorptive surface on the side thereof designed to approximately face the direction of incident solar radiation,
    the pipes in said array being provided with an inner surface having the reflectivity produced by a surface not coarser than that providing a centre-line average of 60$\mu$.

2. A solar heater as claimed in claim 1 wherein said liquid conducting metal pipes are made of brass, copper or bronze.

* * * * *